(12) United States Patent
Guionnet et al.

(10) Patent No.: US 10,467,231 B2
(45) Date of Patent: Nov. 5, 2019

(54) METHOD AND DEVICE FOR ACCESSING A PLURALITY OF CONTENTS, CORRESPONDING TERMINAL AND COMPUTER PROGRAM

(71) Applicant: Orange, Paris (FR)

(72) Inventors: Chantal Guionnet, Cesson-Sevigne (FR); Martinho Dos Santos, Thorigne-Fouillard (FR)

(73) Assignee: ORANGE, Paris (FR)

( * ) Notice: Subject to any disclaimer, the term of this patent is extended or adjusted under 35 U.S.C. 154(b) by 325 days.

(21) Appl. No.: 15/080,088

(22) Filed: Mar. 24, 2016

(65) Prior Publication Data

US 2016/0283557 A1 Sep. 29, 2016

(30) Foreign Application Priority Data

Mar. 27, 2015 (FR) ..................................... 15 52636

(51) Int. Cl.
*G06F 16/00* (2019.01)
*G06F 16/2457* (2019.01)
*G06F 16/248* (2019.01)
*G06F 16/48* (2019.01)

(52) U.S. Cl.
CPC ...... *G06F 16/24573* (2019.01); *G06F 16/248* (2019.01); *G06F 16/48* (2019.01)

(58) Field of Classification Search
CPC ......... G06F 17/30525; G06F 17/30038; G06F 17/30554; G06F 16/24573; G06F 16/248; G06F 16/48

USPC .......................................................... 707/722
See application file for complete search history.

(56) References Cited

U.S. PATENT DOCUMENTS

| 7,653,635 | B1* | 1/2010 | Paek | G06F 17/30038 |
| | | | | 707/999.1 |
| 9,690,786 | B2* | 6/2017 | Berry | G06F 17/30038 |
| 2007/0027861 | A1 | 2/2007 | Huentelman et al. | |
| 2007/0239792 | A1 | 10/2007 | Chen et al. | |
| 2010/0211575 | A1 | 8/2010 | Collins et al. | |
| 2012/0203764 | A1* | 8/2012 | Wood | G06F 17/30247 |
| | | | | 707/722 |

OTHER PUBLICATIONS

French Search Report and Written Opinion dated Jan. 27, 2016 for French Application No. 1552636, filed Mar. 27, 2015.

(Continued)

*Primary Examiner* — Monica M Pyo
(74) *Attorney, Agent, or Firm* — David D. Brush; Westman, Champlin & Koehler, P.A.

(57) ABSTRACT

A method for accessing a plurality of contents by using at least one piece of information representing at least one content selected by the user, called a reference content. The method includes the following acts implemented by a processor: rendering a plurality of pieces of metadata of said reference content, receiving a query for a selection, in said plurality, of at least one piece of metadata, called a sought piece of metadata, determining at least one resultant content, having an intensity level of said at least one sought piece of metadata, and rendering at least one piece of information representing said at least one resultant content.

10 Claims, 5 Drawing Sheets

(56) References Cited

OTHER PUBLICATIONS

English translation of the Written Opinion dated Jan. 27, 2016 for French Application No. 1552636, filed Mar. 27, 2015.
Machine English translation of the Written Opinion dated Jan. 27, 2016 for French Application No. 1552636, filed Mar. 27, 2015.

* cited by examiner

METHOD AND DEVICE FOR ACCESSING A PLURALITY OF CONTENTS, CORRESPONDING TERMINAL AND COMPUTER PROGRAM

1. CROSS-REFERENCE TO RELATED APPLICATIONS

This application claims priority to and the benefit of French Patent Application No. FR 1552636, filed Mar. 27, 2015, the content of which is incorporated herein by reference in its entirety.

2. FIELD OF THE DISCLOSURE

The field of the disclosure is that of multimedia browsing and more particularly that of searching for and presenting multimedia contents and displaying them on a screen. Such contents can be text, sound (or audio material (voice, singing, music, etc.)), images, videos, applications/services or again any combination of these different elements.

The disclosure can be applied especially, preferably but not exhaustively, to browsing in catalogues of contents such as for example a catalogue of podcasts, video on demand (VOD), books, images, etc.

The disclosure can be implemented especially in a terminal provided with a user interface and a graphic interface, for example a tablet, a portable telephone, a smartphone, a personal computer, television set connected to a communications network, etc.

3. PRIOR ART

Today, when a user wishes to access multimedia contents or increase his knowledge of such contents, he has to browse through catalogues of contents, in other words data bases of contents.

Such catalogues, such as for example VOD catalogues, are digital stores that propose a "shelving" of multimedia contents classified thematically and statically so that the user can choose the content that he desires more easily and with greater speed.

These catalogues include especially the Internet Movie Database (IMDb) which is the online database for world cinema, television and video games, rendering a large amount of information on films, actors, directors, scenario writers, or any person involved in the multimedia contents collected in this database.

Upon the user's query made through an interface, these catalogues generally present a detailed information sheet or card on a multimedia content that he can identify and wishes to access.

Such information sheets generally comprise descriptive/technical data, called metadata, such as the title, the duration, the cast, a summary, etc.

When making his search, the user generally enters at least one piece of metadata such as the title, an actor's name or again the genre of the content that he is searching for.

The results obtained according to this type of search correspond to the contents that contain the piece or pieces of metadata entered by the user.

Without prior knowledge of this metadata, the user is unable to define his search and find the contents that he wishes to have.

However, it often happens that one wishes to discover new content but at the same time finds it difficult to express the piece of metadata that enables access to this content.

As a result, the user enters approximate metadata and obtains results that are not always relevant.

At present, browsing by a user through a search engine or catalogue is therefore limited because there is no way in which this user can be aided by computer to define a relevant piece of metadata which will then be used automatically in the search for new contents corresponding to this piece of search metadata.

A solution is therefore needed to assist the user in his search so that he can access the types of contents that he is seeking in a targeted and speedy manner.

4. SUMMARY

An aspect of the present disclosure relates to a method for accessing a plurality of contents by using at least one piece of information representing at least one content, called a reference content.

Such a method is remarkable in that it comprises the following steps implemented by a processor:
   rendering a plurality of pieces of metadata of said reference content,
   receiving a query for a selection, in said plurality, of at least one piece of metadata, called a sought piece of metadata,
   determining at least one other content, called a resultant content, having a level of intensity (or intensity level) of said at least one piece of metadata sought in said set of contents available, and
   rendering said at least one resultant content or at least one piece of information representing said at least one resultant content.

An aspect of the disclosure thus proposes a computer-assisted definition of the relevant piece or pieces of search metadata that the user wishes to retrieve according to a certain level of intensity in the contents coming from the search.

According to an aspect of the disclosure, such computer-operated assistance in defining relevant sought pieces of metadata consists of an input of one or more first contents, called reference contents (or again initial contents), identified by means of a representative information element such as a title or an image representing this multimedia content (the image being for example extracted from the multimedia content, corresponding for example to the video content or corresponding to the jacket or cover associated with it).

The information representing this reference content can be entered manually, or vocally, by the user through a graphic interface or a voice entry tool respectively, of the device according to an aspect of the disclosure or it can be selected manually or vocally from a predefined list preliminarily rendered to the user, or again presented automatically to the user when it is for example the last content rendered by the rendering module of the device.

Once this representative information element has been received, all the pieces of metadata of this reference content are rendered automatically to the user on a graphic window of a rendering screen or by means of a speaker device, enabling the user to define what he likes or does not like in the reference content that he is using as a starting point, whereas without this step he would not have been able to formalize his search.

According to the present disclosure, the term "metadata" is understood to mean descriptive/technical data about the multimedia content such as the title, the duration, the cast, as well as descriptive/technical data representing elements of the contents such as names of actors, singers, editors, producers or again themes dealt with in the reference content, etc. Keywords of greater precision can be associated with a piece of metadata. For example, "period films", "sea adventures", "superhero films", and "big budget" films are keywords more precise than the content-descriptive metadata "blockbuster" (or "big show") with which they are associated.

Thus, the rendering step can have different hierarchical levels of granularity of the descriptive/technical data of a content.

The set of pieces of metadata of this reference content automatically rendered to the user can be preliminarily selected by the user or by a service provider proposing the execution of the method according to the present disclosure to its user.

In particular, the rendering of this set can be modified according to the size of the rendering screen which differs for example from a tablet to a portable phone or again a television receiver connected to a communications network. For example, for small-sized screens, the quality of the rendering of this set will be modified or even downgraded in terms of resolution.

Thus, through this rendering according to the disclosure, the user manages to pinpoint the metadata that he wishes to retrieve or which, on the contrary, he wishes to exclude from his search.

Such assistance is therefore implemented relative to the reference content.

Thus, through the present disclosure, the user can for example identify one or more reference contents which have especially pleased him and use this content or these contents as starting points to personalize his search for contents, called resultant contents, distinct from the reference content or contents.

According to another example, the user's appreciation of the reference content is mitigated and the rendering step according to the disclosure enables him to determine which metadata he wishes to retrieve in the contents coming from his search and which pieces of metadata of these reference contents he wishes, on the contrary, to ignore.

According to an aspect of the disclosure, the selection query made, for example, by the user and received by the reception module of the device according to an aspect of the disclosure therefore identifies the part of the metadata of the reference contents that the determining module of the device according to the disclosure must exploit, completely or partially, to determine at least one resultant content.

Such a resultant content will be identified, during the step for determining, in a database comprising a plurality of available contents, because it has (i.e. with a non-zero intensity level) or does not have (i.e. with a zero intensity level) at least one of the relevant sought pieces of metadata previously defined according to an aspect of the disclosure. In other words, according to one embodiment, called a general embodiment, the expression "intensity level" represents the presence (when it is desired that the resultant content should "equally" present the sought piece of metadata selected from the pieces of metadata of the reference content) or on the contrary the absence of the sought piece of metadata selected according to the resultant contents of the determining step.

Such resultant contents are therefore personalized to the user's tastes or expectations. In addition, the fact of selecting the relevant pieces of metadata to be retrieved according to a certain intensity level in the content or contents coming from the search optimizes the target of the search and therefore accelerates it and enables real-time implementation.

These resultant contents, or the information elements representing these resultant contents (such as a title or an image representing this multimedia content (the image being extracted from the video content or corresponding to the jacket that is associated with it), are then rendered to the user on at least one second graphic window or via a speaker.

The techniques of the prior art do not allow such performance levels and such personalizing of the search for contents.

The method of access to contents is for example implemented in a terminal such as for example a tablet, a portable telephone, a smartphone, a personal computer, a connected television receiver connected to a communications network, etc.

According to one particular embodiment, said intensity level is defined, in said query, relative to said reference content.

In other words, the intensity level of the metadata of the reference content that is selected by the user during the step of rendering is considered to be a reference intensity level. The intensity level defined within the query indicates the proportion, relative to the reference intensity level, in which the sought metadata must be present in the resultant contents to be determined.

Certain service providers provide access to contents wherein the intensity level of certain pieces of metadata of contents is quantified in the search database used. An aspect of the disclosure can therefore be applied to this type of existing content to which intensity levels of metadata have been pre-assigned.

However, these service providers does not propose to define the intensity level of a piece of search metadata with reference to the intensity level of a piece of metadata of an initial content used to assist the user during the relevant definition of his search.

According to one particular embodiment, said method furthermore comprises a preliminary step for assigning an intensity level to at least one piece of metadata, called a piece of metadata to be quantified, of each content of said set of contents available, said step of assigning comprising the following sub-steps implemented for said piece of metadata to be quantified:

predetermined weighting of a keyword associated with said piece of metadata to be quantified and/or weighted by a predetermined combination of a plurality of keywords associated with said piece of metadata to be quantified, delivering one or more weights assigned to said piece of metadata to be quantified,     obtaining said intensity level of said metadata to be quantified after totalizing the levels obtained during said step of weighting and standardizing of the results of said totalizing.

If we take the example of the piece of content-descriptive metadata, "blockbuster", the keywords "superheroes film" associated with this "blockbuster" piece of metadata will have for example a weight of four, the keywords "big budget" will have for example a weight of two, while the combination of the words "classic film" and "death" will have a weight of one, or the combination of the keywords "major battles" and "space wars" will obtain a weight of four according to rules predetermined for example by a service provider.

For a content associated with the set of keywords "superheroes film" and "big budget" of the "blockbuster" piece of metadata referred to here above, the set of keywords "superheroes film" and "big budget film", will therefore collect a total weight of six, while for the contents having all together the keywords "superheroes film", "big budget film", and the combination "classic film" and "death" and "major battles" and "space wars", the set of the keywords "superheroes film" and "big budget" considered with the combinations "classic film" and "death", and "major battles" and "space wars" will obtain a total weight of 11.

Because the descriptive pieces of metadata do not all have an equal number of associated keywords and because the weights associated with these key-words are varied, a standardizing of the total weight obtained enables comparison of the metadata in terms of intensity level.

Thus, for the content associated with the set of keywords "superheroes film" and "big budget film", the piece of metadata "blockbuster" would obtain the intensity level of 0.545.

According to one particular aspect of the disclosure, said intensity level defined relative to the reference content belongs to the group comprising at least:
  an intensity level of said sought piece of metadata that is the same as that of said reference content,
  an intensity level of said sought piece of metadata higher than that of said reference content,
  an intensity level of said sought piece of metadata lower than that of said reference content,
  an intensity level of said sought piece of metadata that is zero.

The definition of intensity level in the query can correspond to the entry of a digital value representing the intensity level desired by the user relative to the reference intensity level of the sought piece of metadata as selected in the reference content, or it can correspond to the entry of appreciations of the user such as "equally", "absolutely not", "more" or again the entry of a percentage or again the use of cursor.

The definition of such an intensity level therefore makes it possible to "dose" or "adjust" the intensity level of the selected metadata sought.

The method according to an aspect of the disclosure uses this information to automatically (i.e. without human intervention) extract N contents among M (with M>N) contents available, these N contents comprising the metadata sought with a level compliant with the intensity level defined by the user relative to the reference contents.

According to one particular embodiment, when at least first and second sought pieces of metadata are selected by the user in said plurality, said query comprises:
  for said first sought piece of metadata, an information element representing a first intensity level defined by the user relative to said reference content, and
  for said second sought piece of metadata, an information element representing a second intensity level defined by the user relative to said reference content,
and said step for determining delivers at least one resultant content presenting said first intensity level of said first sought piece of metadata and/or said second intensity level of said second sought piece of metadata.

Such a determining restricts/widens the field of the search for contents in the set of contents available in taking account respectively of the first intensity level of the first sought piece of metadata and/or the second intensity level of the second sought piece of metadata.

According to this embodiment, it is the device for accessing a plurality of contents that determines the resultant contents by applying a predetermined "AND" rule, a predetermined "OR" rule or both rules to deliver maximum results to the user.

According to another particular embodiment, said query furthermore comprises an indicator of combination of said at least first and second sought pieces of metadata, said step for determining taking account of said indicator of combination.

Thus, it is possible within this query to augment the personalizing of its search by indicating which type of combination (namely "and/or") of sought metadata, selected from the plurality of metadata associated with the reference content, must be implemented by the automatic determining of the resultant contents of the disclosure.

In other words, according to this embodiment, it is the user who specifies within the request whether the step for determining takes account of the "AND" rule, the "OR" rule, or both rules.

Such an intervention by the user can be implemented through a dedicated graphic location optionally enabling the user to indicate this "AND" and "OR" operator in the first graphic window when several sought pieces of metadata are selected. It can for example take the form of a scrolling menu with the options "and", "or", "and+or". In voice mode, such an indication can be done orally and then interpreted by the device according to the disclosure by means of a voice recognition tool.

According to another embodiment, when at least one first sought piece of metadata and at least one second sought piece of metadata are selected by the user in said plurality, said step for determining takes account of a predetermined order of priority between said first and second sought pieces of metadata.

For example, the automatic determining according to an aspect of the disclosure can give preference to a line of search based on a piece of metadata about a main actor in a content rather than a piece of metadata about the filming of this content.

According to yet another embodiment, the method furthermore comprises a step for rendering said at least one sought piece of metadata of said resultant content and its intensity level.

Such a voice rendering via a speaker device or visual rendering via a graphic window enables the user to understand the reason why the resultant content has been automatically extracted from the set of contents available by means of the method according to an aspect of the disclosure.

Thus, if two sought pieces of metadata have been selected by the user and if the method according to the disclosure delivers all the resultant contents comprising: one of the pieces of metadata, the other piece of metadata or both pieces of metadata, then, through this step for rendering the second sought piece of metadata, the user can be assisted in a subsequent step for selecting one of said resultant contents to be rendered.

According to yet another embodiment, when the renderings according to the disclosure are done by means of graphic windows, the graphic windows are rendered on a same screen or on a plurality of screens communicating with the same graphic card.

Such a rendering enables the user to view the following at the same time, the information representing the reference content, his selection of a sought piece of metadata or of sought pieces of metadata among the plurality of pieces of metadata of the reference content and the resultant contents obtained at the end the step for determining contents according to the disclosure which takes account of the wishes concerning metadata to be sought, defined by the user relative to a reference content. According to one particular aspect, the two graphic windows can correspond to the case of a screen connected by a DVI cable to another rendering device also provided with a screen, for example a laptop.

According to this example, the selection query can be entered on one dedicated screen and the resultant content or contents obtained or the information elements representing these contents can be viewed on another screen, for example a bigger screen, connected to the same graphic card as the screen dedicated to entry by the user. This second bigger screen can for example correspond to a rear projection screen whose size enables the rendering of a large-sized list of resultant contents or of their respective representative information elements (corresponding for example to ten images (film jackets)) representing ten resulting multimedia contents) configured to be visible at every point of an amphitheater, especially when a "games" mode is implemented for example for educational purposes. This second screen also enables the rendering, for each result, of the piece of metadata or elements that have justified its automatic extraction from the set of contents available during the determining step.

The different embodiments mentioned here above can be combined with one another to implement one or more aspects of the disclosure.

The disclosure also pertains to a device for accessing a plurality of contents from at least one information element representing a content belonging to the set of contents available, called a reference content.

Such an access device is remarkable in that it comprises:
  a module for rendering a plurality of pieces of metadata of said reference content,
  a module for receiving a query for selection, in said plurality, of at least one piece of metadata called a sought piece of metadata,
  a module for determining at least one other content, called a resultant content, having an intensity level of said at least one sought piece of metadata in said set of contents available,
said rendering module, rendering said at least one resultant content or at least one information element representing said at least one resultant content.

Such an access device for access to a plurality of contents is especially adapted to implementing the method for access to a plurality of contents as described here above.

This device could of course comprise the different characteristics pertaining to the method for accessing a plurality of contents, as described her above, which can be combined or taken in isolation. Thus, the characteristics and advantages of this device for accessing a plurality of contents are the same as those of the method of access described here above. They are therefore not described in more ample detail.

The disclosure also pertains to a terminal comprising the device for accessing a plurality of contents mentioned here above.

Such a terminal is for example a tablet, a laptop, a smartphone, a personal computer, a television receiver connected to a communications network, etc.

According to one implementation, the different steps of the method for accessing a plurality of contents as described here above are implemented by one or more software programs or software module programs comprising software instructions intended for execution by a data processor of a device for accessing a plurality of contents, these software instructions being designed to command the execution of the different steps of the method according to an aspect of the disclosure.

The disclosure therefore also pertains to a computer program capable of being executed by a computer or by a data processor, this program comprising instructions to command the execution of the steps of a method for accessing a plurality of contents as mentioned here above.

This program can use any programming language whatsoever and be in the form of source code, object code or intermediate code between source code and object code, such as in a partially compiled form or any other desirable form whatsoever.

The information carrier can be any entity or device whatsoever capable of storing the program. For example, the carrier can comprise a storage means such as a ROM, for example a CD ROM or a microelectronic circuit ROM or again a magnetic recording means, for example a floppy disk or a hard disk drive.

Again, the information carrier can be a transmissible carrier such as an electrical or optical signal which can be conveyed via an electrical or optical cable, by radio or by other means. The program according to an aspect of the disclosure can be especially uploaded to an Internet type network.

As an alternative, the information carrier can be an integrated circuit into which the program is incorporated, the circuit being adapted to executing or to being used in the execution of the method in question.

According to one embodiment, an aspect of the disclosure is implemented by means of software and/or hardware components. In this respect, the term "module" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions as described here below for the module concerned. Such a software component is executed by a data processor of a physical entity (terminal, server, gateway, router, etc) and is capable of accessing hardware resources of this physical entity (memories, recording media, communications buses, input/output electronic boards, user interfaces, etc).

In the same way, a hardware component corresponds to any element of a hardware unit capable of implementing a function or a set of functions as described here below for the module concerned. It can be a programmable hardware component or a component with an integrated processor for the execution of software, for example an integrated circuit, a smartcard, a memory card, an electronic board for the execution of firmware, etc.

5. LIST OF FIGURES

Other features and advantages of the proposed technique shall appear more clearly from the following description of a preferred embodiment, given by way of a simple illustratory and non-exhaustive example and from the appended drawings, of which

6. DESCRIPTION OF ILLUSTRATIVE EMBODIMENTS OF THE DISCLOSURE

6.1 General Principle

The general principle of an exemplary aspect or embodiment of the disclosure relies on the use of a first multimedia content, called a reference or initial content, to assist the user in determining his search criteria to access new multimedia contents.

In other words, through an initial content, of which the metadata is rendered to the user, the user determines the pieces of metadata that he wishes to retrieve in the new contents that are objects of his search.

Such rendering enables the user to detect and then select one or more elements pertaining to the reference content that he also wishes to retrieve in new contents. According to one general embodiment of the disclosure, the user selects at least one element relating to the reference content, i.e. at least one piece of metadata associated with this reference content according to an intensity level:

not zero, when the user desires the presence of the piece of metadata in each new content that he seeks, or zero when the user desires the absence of the piece of metadata in each new content that he seeks.

Thus, through an aspect of the disclosure, the user is able to easily and precisely formalize the object of this search, so much so that the contents, compliant with his search criteria and determined automatically, are personalized.

Figure 1:
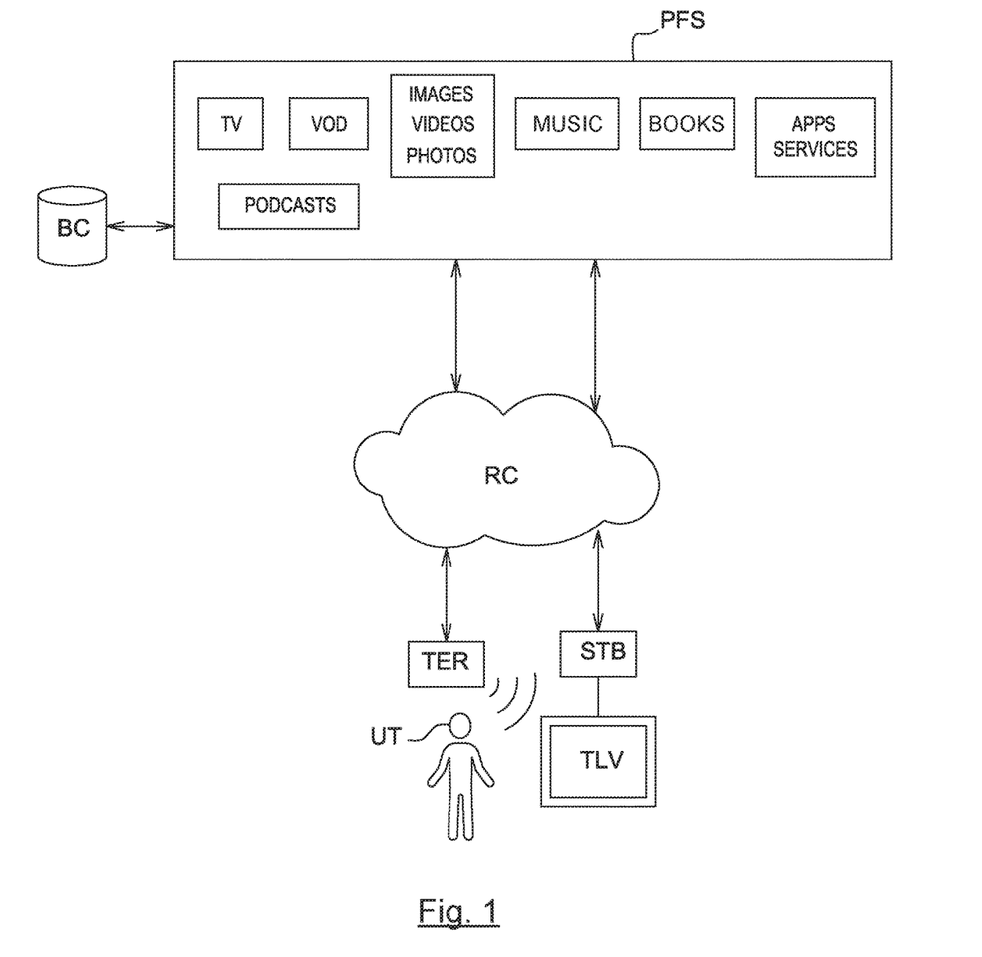
FIG. 1 is a schematic view of an architecture implementing the method for accessing a plurality of contents according to an embodiment of the disclosure.

Referring first of all to FIG. 1, we present an architecture implementing the method of access to a plurality of contents according to an aspect of the disclosure.

Such an architecture comprises a terminal TER for accessing contents proposed by a service platform PFS via a communications network RC such as for example of an IP (Internet Protocol) type. The service platform PFS proposes different types of contents to the user UT of the terminal TER such as for example:

television contents TV, especially those with scheduled broadcasting in a grid of programs, VOD catalogues, video and/or image and/or photo catalogues, music or podcasts catalogues, digital book catalogues, catalogues of applications and/or services.

The above-mentioned architecture enables the user UT of the terminal TER to access the contents proposed both in a situation of mobility and in a sedentary situation.

In a situation of mobility, the terminal TER is for example a cell phone, a smartphone, a tablet, a laptop, etc.

In a sedentary situation, the terminal TER could be a PC type personal computer.

Again, in a sedentary situation, and as shown in FIG. 1, the terminal TER consists, for example, of:

an access terminal STB that is capable of receiving and processing the contents coming from the platform PFS, and a display terminal, for example a television set TLV as shown in FIG. 1, capable of rendering the contents processed by the access terminal STB to the user UT.

In one example of an embodiment, the access terminal and the display terminal are brought together in a single terminal. This could for example be a television set containing a set-top box type of decoder. In another example, the access terminal STB is a set-top box and the terminal TER is a tablet acting as a display terminal connected to the set-top box by means of a local area network, for example a wireless network, in particular of the Wi-Fi or PLC (power line communication) type.

The access terminal STB just like the terminal TER furthermore comprises means of connection to the communications network RC which for example can be of the x-DSL, or fiber type or again of the 3G and 4G types. According to an aspect of the disclosure, the service platform PFS interfaces with a set of available contents, called a knowledge base BC, which for each content proposed by said platform, contains a preliminary indexing of each content by metadata.

Figure 2:
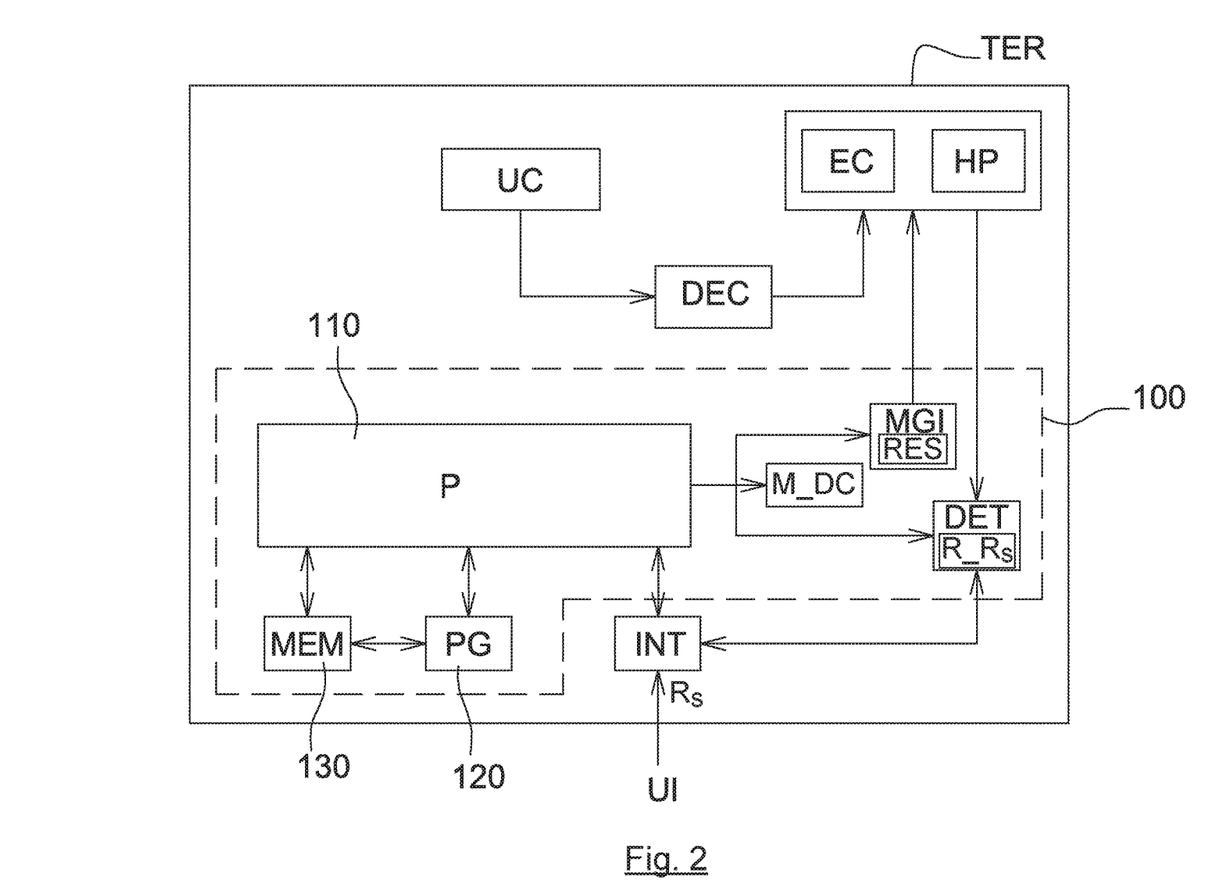
FIG. 2 presents the simplified structure of a device for accessing a plurality of contents according to one embodiment of the disclosure.

Referring to FIG. 2, we now consider the simplified structure of a device 100 for accessing a plurality of contents according an exemplary embodiment. Such a device for accessing is adapted to implementing the method for accessing a plurality of contents according to an aspect of the disclosure, which shall be described here below.

In this example, the access control device 100 is integrated into a terminal TER as shown in FIG. 1, for example a smartphone.

In the example shown in FIG. 2, the device 100 comprises a processing unit 110 equipped for example with a processor P and driven by a computer program PG 120 stored in a memory MEM 130 and implementing the method for accessing a plurality of contents according to an aspect of the disclosure. The terminal TER comprises a communications unit UC which contains a sending/receiving module adapted to:

sending out a request for access to a plurality of contents made available in the service platform PFS of FIG. 1, on the basis of the selection of at least one piece of metadata of a reference content, receiving the plurality of contents associated with the selected piece of metadata.

At initialization, the code instructions of the computer program PG 120 are for example loaded into a RAM (not shown) and then executed by the processor P of the processing unit 110. The processor of the processing unit 110 implements the steps of the method for accessing a plurality of contents which shall be described here below, according to the instructions of the computer program 120.

In a manner known per se, the terminal TER comprises:

a module INT for processing user interactions UI, a display screen EC, a speaker HP, an interface DEC for the audio/video decoding of text, audio, video or audiovisual signals representing received contents, said interface being adapted to transmitting the decoded signals to the screen EC or the speaker HP.

According to an aspect of the disclosure, the device for accessing 100 furthermore comprises interface generating means MGI comprising especially a rendering module RES for rendering a plurality of pieces of metadata of the reference content, means DET for detecting user interactions, comprising especially a reception module R_Rs for receiving a query for selection Rs, in a plurality of pieces of metadata of the reference content, of at least one piece of metadata called a sought piece of metadata, and a module M_DC for determining at least one resultant content having an intensity level of said at least one sought piece of metadata in said set of available contents, said rendering module RES rendering said at least one resultant content or at least one piece of information representing said at least one resultant content.

These means and modules are described in greater detail here below in the description and are driven by the processor P of the processing unit 110.

Figure 3:
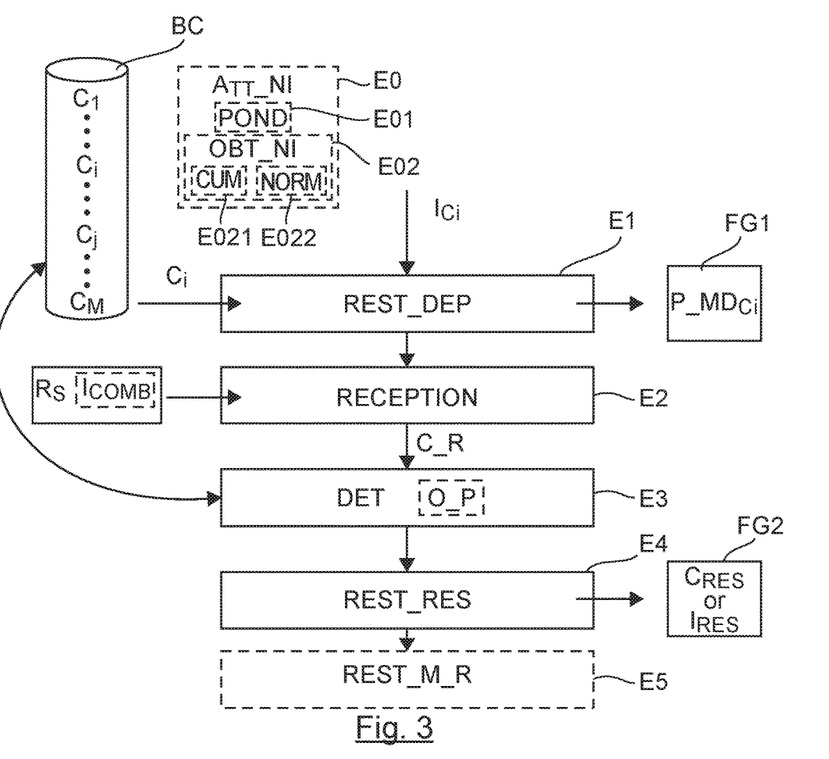
FIG. 3 presents a schematic view of the main steps of a method for access according to an embodiment of the disclosure.

Referring to FIG. 3, we now present the steps of the method for accessing a plurality of contents in compliance with an embodiment according to the disclosure. In the embodiment shown, the method of access is implemented by the terminal TER shown in FIGS. 1 and 2.

A step E1 shown in FIG. 3 consists of the rendering, for example visually, on a first displayed graphic window FG1 displayed on the screen EC of a plurality $P\_MD_{Ci}$ of P (P being an integer), pieces of metadata MD1 ... MDP of a first content Ci, called a reference content, belonging to a set of M contents available within the knowledge base BC shown in FIG. 1.

Such a reference content C1, depending on the embodiment, is illustrated in FIG. 3, identified by means of a piece of representative information ICi such as a title or an image representing this multimedia content (the image being for example extracted from the multimedia content, for example a video content, or corresponding to the jacket that is associated with it).

The information representing this reference content Ci can be entered manually or by voice by the user UT through the graphic interface means generated by the interface generating means MGI, or a voice entry tool respectively of the device according to the disclosure represented by FIG. 2, or selected manually or by voice from a predefined list rendered preliminarily to the user UT on the screen EC of the terminal TER shown in FIG. 2, or again presented automatically to the user UT on this same screen EC when it is for example the last content rendered by the rendering module RES of the terminal TER shown in FIG. 2.

For example, the user UT wishes to find multimedia contents corresponding to films on the basis of the last film (i.e. the reference content according to the disclosure) that he has just viewed.

The first rendering step E1 corresponds for example to a scrolling menu containing the metadata MD1 "true story adaptation", MD2 "romantic drama", MD3 "at sea", MD4 "blockbuster" as illustrated here below in the example of implementation represented in FIG. 4A.

During a step E2 shown in FIG. 3, the reception module R_Rs receives a query $R_s$ for selection, in said plurality $P\_MD_{Ci}$ of at least one piece of metadata, called a sought piece of metadata.

More specifically, such a selection made by the user UT is processed by the module INT for processing user interactions represented in FIG. 2. This triggers the dispatch of the query $R_s$, to the platform PFS of FIG. 1 through the communications module UC of the terminal TER.

Figure 4A:
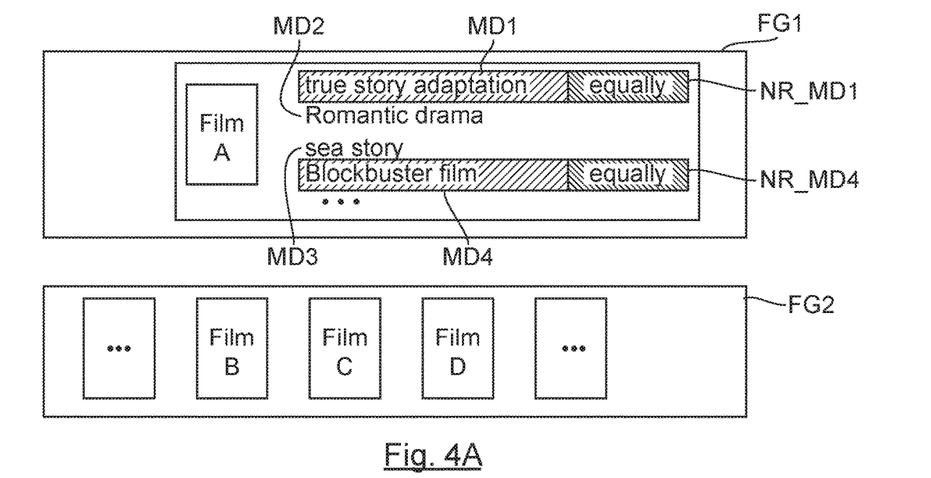
FIGS. 4A to 4C show different examples of an interface for accessing a plurality of contents according to an embodiment of the disclosure.

Such a query $R_s$ corresponds for example to an identification within the first graphic window FG1, by highlighting using a predetermined color or pattern, for example red, in the plurality of pieces of metadata $P\_MD_{Ci}$, of the pieces of metadata MD1, "true story adaptation", and MD4, "blockbuster", following a mouse click by the user UT on these pieces of metadata, according to the example of implementation shown in FIG. 4A but could also correspond to a box ticked off by the user UT for each piece of metadata that he wishes to select.

It must be noted that according to one aspect of the disclosure, the user UT can furthermore define an intensity level NR of the metadata sought within the request $R_s$, and can do so relative to the reference content Ci.

For example, in relation to the example of implementation illustrated in FIG. 4A, the user wishes an equivalent "dosing" of the piece of metadata MD1, "true story adaptation", of the reference content Ci in the new contents that he wishes to access by using the method of access to a plurality of contents according to the disclosure.

To this end, referring to FIG. 4A, the level of dosage is for example identified by the user UT within the first graphic window FG1, by highlighting the level "equally" of the piece of metadata MD1 for example selected within a scrolling menu comprising appreciations such as "equally", "absolutely not", "more", "less", etc.

Optionally (not shown), it is also possible for the query $R_s$ to comprise a piece of metadata additional to the sought metadata selected within the plurality of pieces of metadata $P\_MD_{Ci}$. To this end, the user UT can for example enter this piece of additional data (and its intensity level if necessary) into a dedicated field of the first graphic window FG1.

In other words, this aspect enables the user to add an additional "ingredient" to his "recipe" of pieces of metadata concocted out of the reference content Ci. The user UT therefore, through an aspect of the disclosure, has tools available to help him in the personalizing of his search for new contents.

Upon reception of this request $R_s$, in a step E3 shown in FIG. 3, the platform PFS interfaces with the knowledge base BC also represented in FIG. 1, with a view to determining at least one resultant content having an intensity level of said at least one sought piece of metadata. The contents thus determined can be text, sound (or audio), images, videos, applications/services or again any combination of these different elements.

According to one embodiment (not shown), the present disclosure is applied to the knowledge base BC comprising contents to which intensity levels of metadata have been pre-allocated.

Optionally, as shown in dashes in FIG. 3, the method according to an aspect of the disclosure comprises a preliminary step E0 of this kind for assigning an intensity level NI to at least one piece of metadata MD, called a piece of metadata to be quantified, of each content of the set of contents available in the knowledge base BC.

It must be noted that not all the pieces of metadata of a content can be quantified by more than two intensity levels NI. For example, a piece of metadata pertaining to an actor, a director, an author or again a singer can be quantified only by a level identical to that of the reference content or by a zero level, when it is sought to exclude an artist.

By contrast, a piece of metadata pertaining to a theme, a period of fiction, an instrument, a duration can be quantified by means of any unspecified number of intensity levels.

Such a preliminary step for assigning E0 comprises for example the following sub-steps implemented for said piece of metadata to be quantified:

predetermined weighting E01 of at least one keyword associated with said piece of metadata to be quantified and/or weighting E01 of a predetermined combination of a plurality of keywords associated with said piece of metadata to be quantified, delivering one or more weights assigned to said piece of metadata to be quantified, obtaining E02 said intensity level of said piece of metadata to be quantified after totalizing E021 the weights obtained during said step of weighting and personalizing E022 of the result of said totalizing operation E021.

For example, for the piece of metadata MD1 "blockbuster" of the reference content Ci, the following keywords (the keywords being preliminary distributed among predetermined categories of keywords) have been counted and a code, for example a binary code, has been assigned to them:

"impossible to sleep" (0000) of the category "moods",
"amazing" (0001) of category "moods",
"historical battles" (0100) of the category "theme",
"futuristic adventures" (0101) of the category "theme",
"mind-blowing" (0010) of the category "tones",
"natural disaster" (0011) of the category "genre",
"action film" (0110) of the category "genre",
"apocalyptic" (0111) of the category "genre",
"sea" (1001) of the category "genre",
"heroic fantasy" (1010) of the category "genre",
"horror" (1011) of the category "genre",
"special effects" (1000) of the category "flags".

Weighting rules are also defined, for example by a supplier of services, each rule corresponding to a keyword associated with the piece of metadata or a combination of keywords associated with the piece of metadata reflecting a particular character of this metadata.

For example, for the "blockbuster" metadata, each rule is identified by a code which is associated:
either with the code representing a single keyword constituted by the rule considered,
or by the combination of codes respectively representing keywords constituting the rule considered.

Six examples of rules are illustrated in each row of the following table:

| Rule | Weight | Mood | Theme | Genre | Tone | Flag |
|---|---|---|---|---|---|---|
| 1 | 4 | | | 1010 | | |
| 2 | 2 | 0000, 0001 | | −1011 | 0010 | |
| 3 | 4 | | | 0110, 0111 | | |
| 4 | 2 | | | | | 1000 |
| 5 | 4 | | 0100, 0101 | | | |
| 6 | 1 | | | 0011, 1001 | | |

The table comprises a "Rule" column, a "Weight" column itself followed by one or more "Category" columns. In the example shown, the table has five "category" columns entitled "Mood", "Theme", "Genre", "Tone" and "Flag".

In the table, a single keyword constitutes the rules 1 and 4, while a combination of keywords constitutes the rules 2, 3, 5 and 6.

The boxes containing a negative sign indicate that for the rule to be met, the keyword preceded by the negative sign "−" should be excluded and that the other keywords of the piece of metadata whose codes are seen in the row of the rule should be present in the analyzed content.

Thus, for each content of the knowledge base BC, a weight will be assigned to the "blockbuster" metadata when one of the above rules is met. The validation of a rule consists in ascertaining that the content explicitly presents at least one code representing one keyword per "category" column constituting the rule to be validated.

For example, the presence of the code 0110 will validate rule 3 of the above table.

Should one or more keywords be encoded in negative form, such as the keyword of the box of the table common to the rule 2 and the category "genre", the validation of the rule furthermore consists in ascertaining that said content will possess none of these keywords encoded in negative form.

For example, rule 2 will be validated in the case of the following combinations of codes:
0000 0001 −1011 0010,
0001 −1011 0010,
0000 −1011 0010.

Therefore, if the content complies with at least one rule, then the corresponding piece of metadata is associated with it with a certain weight.

According to the example pertaining to the "blockbuster" piece of metadata, six rules corresponding respectively to the weights 4, 2, 4, 2, 4, 1 can be complied with, and this represents a total weight equal to 17.

Now, given that the data elements do not necessarily have the same number of rules and that the associated weights are varied, the score obtained for the piece of metadata to be quantified needs to be standardized.

Thus, if a content Ci complies only with the rules 1 and 3, then only the corresponding codes are detected and the "blockbuster" piece of metadata obtains a totalized weight E021 equal to eight which, after standardization E022 (division by 17), becomes a standardized intensity level equal to 0.47 which can be represented by a cursor at 4.7 out of 10 or a level of 4.7 for a bar having a level comprising ten levels or again 4.7 stars out of ten stars.

Figure 5:
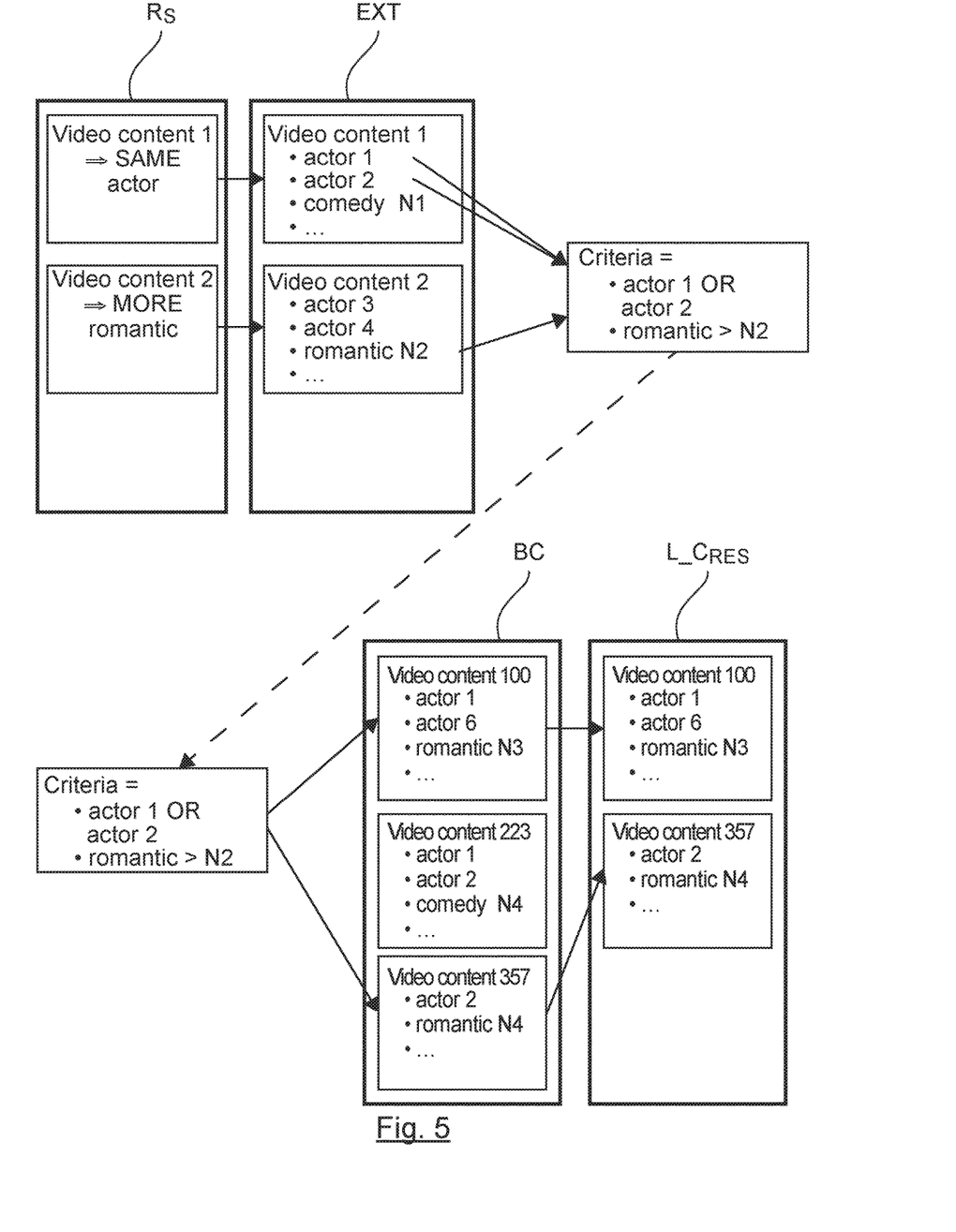
FIG. 5 illustrates an example for implementing the step for determining according to an embodiment of the disclosure.

One example of implementation of the step E3 for determining according to the disclosure is shown in FIG. 5.

According to this example, shown with reference to FIG. 5, the contents are video contents.

On the basis of two video contents "video content 1" and "video content 2", two search criteria are for example defined in the selection query $R_s$. These criteria are the retrieval, in the new contents that the user UT seeks to discover, of the "actor" piece of metadata of the video content 1 and/or the "romantic" piece of metadata of the video content 2 with an intensity level equal to the intensity level of the "actor" piece of metadata (in other words, it is sought to retrieve the same actor or actors), and an intensity level greater than the intensity level of the "romantic" genre in the video content 2.

Given these search criteria defined within the query $R_s$, the determining module M_DC interprets these search criteria by extracting EXT first of all reference contents "video content 1" and "video content 2", the identity of the actors of the video content 1, namely actor 1 and actor 2, and the intensity level of the romantic piece of metadata of the video content 2, namely N2. Such an interpretation furthermore makes it possible to "translate" the expressions used by the user such as "absolutely not" or "more" in terms of intensity level. The expression "absolutely not" corresponds for example to an intensity level NO and the "more" (and "less" respectively) corresponds to the operator ">" (and "<" respectively).

Then, the determining module M_DC extracts new contents from the knowledge base BC, comprising for example the video contents 100, 223 and 357. These new contents are called resultant contents, distinct from the reference contents "video content 1" and "video content 2".

For example, with reference to FIG. 5, among the video contents 100, 223 and 357 only the video contents 100 and 357 of the list $L\_C_{RES}$ result from the determining step E3. Indeed, the content 100 has both the actor 1 of the reference content video 1 and the intensity level N3 of the "romantic" piece of metadata. This is far higher than the level N2 of the "romantic" piece of metadata of the video reference content 1 and the content 357 has both the actor 2 of the video reference content 2 and an intensity level N4 of the "romantic" piece of metadata which is higher than the level N2 of the "romantic" piece of metadata of the video reference content 2.

By contrast, the video content 223 was not chosen during the step for determining E3 because it did not have the "romantic" piece of metadata.

In the example illustrated with reference to FIG. 5, it must be noted that the actor 1 and the actor 2 of the "actor" piece of metadata were taken into account by default during the determining step E3 with the logic operator "OR" and that the two pieces of data, "actor" and "romantic", were combined by default with the logic operator "AND".

According to this embodiment, it is therefore the device for accessing a plurality of contents, namely the terminal TER, that dictates by default the type of combination to be applied: "AND", a rule "OR" or both to deliver maximum results to the user.

According to another optional embodiment, shown in dashes in FIG. 3, the user UT can specify, within the request, an indicator $I_{COMB}$ of combination of the pieces of metadata.

According to another optional embodiment, shown in dashes in FIG. 3, the step for determining E3 takes account of a predetermined order of priority O_P between the first and second pieces of metadata sought.

For example, the automatic determining according to the disclosure can favor a line of search based on a piece of metadata relative to the main actor of a content as compared with a piece of metadata relative to the "romantic" genre which can enable delivery of a result when no content of the knowledge base BC can satisfy the combination of search metadata using the "AND" operator. According to one particular embodiment, taking account of this order or priority is triggered only when the default combinatorial search has delivered no result.

Then, the platform PFS sends the list $L\_C_{RES}$ back to the terminal TER, through the communications network RC. An example of this list $L\_C_{RES}$ is shown in FIG. 5. During a step E4 shown in FIG. 3, the result of the determining step E3 is rendered, for example visually or vocally. To this end, the resultant contents $C_{RES}$ of the list $L\_C_{RES}$ or else one or more pieces of information $I_{RES}$ relative to the resultant contents are displayed, for example visually, on a second graphic window FG2 (which can possibly coincide with the first graphic window FG1 or be superimposed on this window) of the screen EC of the terminal TER, by means of the interface-generating means MGI of FIG. 2.

When the terminal TER has a small-sized screen or is in a situation of mobility, such a list can be provided by sound, using a speaker HP shown in FIG. 2. In this example, each content of the list $L\_C_{RES}$ is presented orally to the user in mentioning especially a piece of information representing the resultant content $I_{RES}$:
 the type to which the content belongs (e.g.: photograph, film, music, book, etc.),
 the title of the content,
 etc.

To pass from one content to the next, the user UT pronounces for example the word "next". To pass to a previous content, the user UT pronounces for example the word "previous".

When the screen EC of the terminal TER has a screen of sufficiently large size or in a sedentary situation, such a list can be provided visually, using said screen EC. In this example, the contents appear in a list. Each content of the list is identified especially by a piece of information $I_{RES}$ representing the resultant content, such as a title or an image representing this multimedia content (the image being for example extracted from the multimedia content, corresponding for example to the video content or corresponding to the jacket associated with it).

The user UT can then reach such and such a content of the list by means of a cursor or by touch.

Optionally, during a step E5 shown in FIG. 3, the search criteria, namely the metadata selected by the user in the plurality of metadata of the reference content, are also rendered to enable the user to understand why the resultant content or contents have been automatically extracted from the set of contents available by means of the method according to an aspect of the disclosure.

6.2 Detailed Examples of Implementation

Figure 4B:
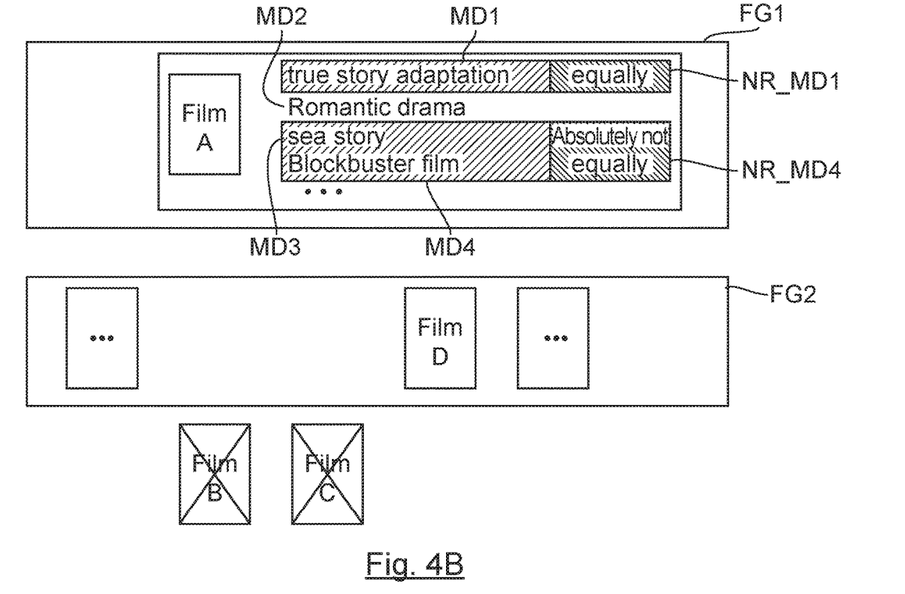
Figure 4C:
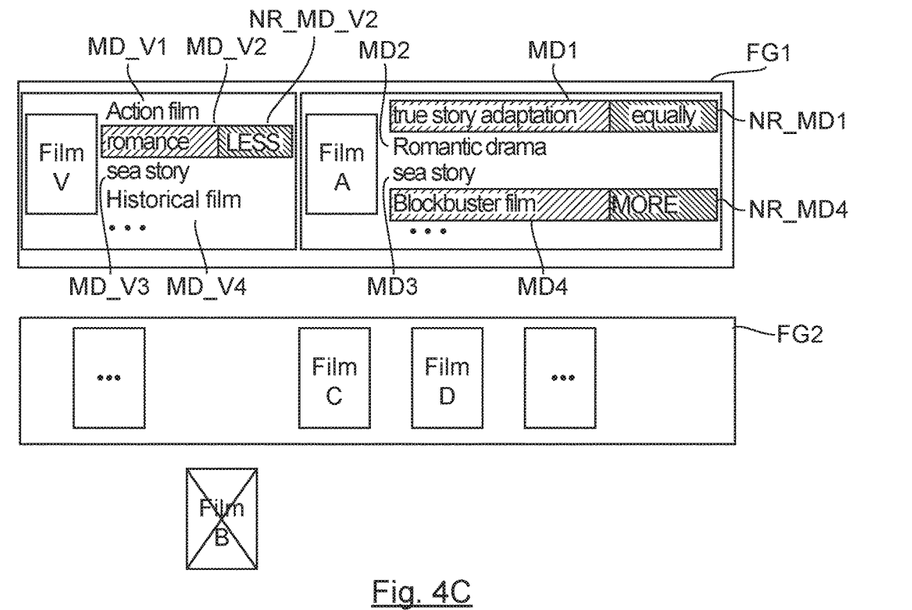

Referring to FIGS. 4A to 4C, we present three examples of a graphic interface during the implementation of the method according to the disclosure by the terminal TER of FIG. 2.

According to the example shown in FIG. 4A, the user UT has recently watched the content corresponding to the film A, entitled "Britannic" and was enthralled by this film. He would like to experience similar feelings with another film but is finding it difficult to formulate the object of his search to access new contents with the classic methods of the prior art which assume prior and precise knowledge of what is wishing to access.

According to an aspect of the disclosure, starting from the film A "Britannic", a plurality of pieces of metadata MD1, MD2, MD3 and MD4 of this content are rendered visually to the user via the graphic window FG1 on the screen EC of the terminal TER of the user UT.

The user UT then by touch or using a cursor selects the metadata MD1 and MD4: "true story adaptation" and "blockbuster film" respectively. Such a selection for example highlights the selected pieces of metadata MD1 and MD4 in comparison with the unselected pieces of metadata MD2 and MD3.

In addition, according to the embodiment shown in FIG. 4A, the user indicates the intensity level (NR_MD1 and NR_MD4) of these pieces of metadata, namely "equally". In other words, the user UT wishes to access new contents which will "equally" well have the pieces of metadata MD1 and MD4.

The step for determining E3 according to an aspect of the disclosure as described here above then makes real-time delivery of the list $L\_C_{RES}$ of resultant contents comprising the films B, C and D corresponding respectively to the films which are, at the same time, true story adaptations and blockbusters such as for example "Titanic", "Tempest" and "Flight 93".

According to the example shown in FIG. 4B, the user UT has wishes identical to those of the example illustrated in FIG. 4A using as a reference content the film A entitled "Britannic". However, the user wishes to personalize his search in furthermore selecting the metadata "at sea" and specifying the intensity level of this metadata by means of the expression "absolutely not".

Indeed, the user does not wish for example to view films about the sea for two evenings in succession.

In this case, the step for determining E3 according to an aspect of the disclosure as described here above then makes a real-time delivery of the list L_C$_{RES}$ of the resultant contents which, as compared with FIG. 4A, henceforth include only the film D entitled "Flight 93", the films B and C corresponding to "Titanic" and "Tempest" being excluded by the fact that they take place at sea.

Finally, according to this example shown in FIG. 4B, the user UT has wishes identical to those of the example illustrated according to FIG. 4A, using, as a reference content, the film A whose title is "Britannic". However, he wishes to personalize his search by furthermore selecting the "romantic" piece of metadata and specifying the intensity level of this piece of metadata, this time relative to another content which is the film V for example "Notting Hill" by using the expression "less".

In this third case, the step for determining E3 according to an aspect of the disclosure as described here above then makes a real-time delivery of the list L_C$_{RES}$ of resultant contents which, as compared with FIG. 4A, henceforth contain only the films C and D respectively entitled "Tempest" and "Flight 93", the film B corresponding to "Titanic" having been excluded because of the intensity level of its "romantic" metadata was not lower than the intensity level of the "romantic" piece of metadata of the film V entitled "Notting Hill".

An aspect of the disclosure that has just been described here above is particularly well suited to proposing access to a plurality of contents both in both a sedentary and a mobile situation.

An exemplary embodiment of the present disclosure proposes a novel solution, which does not have the drawbacks of the prior art described above, in the form of a method for accessing a plurality of contents by using at least one piece of information representing at least one content, called a reference content.

It goes without saying that the embodiments that have just been described here above have been given purely by way of an indication and are in no way restrictive, and that numerous modifications can be easily made by those skilled in the art without in any way departing from the framework of the disclosure or the appended claims.

The invention claimed is:

1. A method for accessing a plurality of contents by using at least one piece of information representing at least one content, called a reference content, said reference content belonging to a set of available contents, said method comprising the following acts implemented by a processor of an access control device:
rendering a plurality of pieces of metadata of said reference content on a rendering device,
selecting, through a user interface of the access control device, in said plurality of pieces of metadata of said reference content, at least one piece of metadata, called a sought piece of metadata, said sought piece of metadata being associated to a reference intensity level in said reference content,
defining, through the user interface, a desired intensity level of said sought piece of metadata relative to said reference intensity level, said desired intensity level indicating a proportion, relative to the reference intensity level, in which said sought piece of metadata must be present in contents to be determined, determining from said set of available contents, at least one other content, called a resultant content, based on said sought piece of metadata and said desired intensity level associated to said sought piece of metadata, said resultant content having an intensity level of said sought piece of metadata corresponding to said desired intensity level,
receiving from the communication network, said at least one resultant content or at least one piece of information representing said at least one resultant content, and
rendering on the rendering device said at least one resultant content or said at least one piece of information representing said at least one resultant content.

2. The method for accessing a plurality of contents according to claim 1, wherein said desired intensity level defined relatively to said reference content belongs to the group consisting of:
a desired intensity level of said sought piece of metadata that is the same as that of said reference content,
a desired intensity level of said sought piece of metadata higher than that of said reference content,
a desired intensity level of said sought piece of metadata lower than that of said reference content,
a desired intensity level of said sought piece of metadata that is zero.

3. The method for accessing a plurality of contents according to claim 1, wherein, when selecting at least one piece of metadata comprises selecting at least one further sought piece of metadata, said defining comprises:
defining for said further sought piece of metadata a further intensity level relative to said reference content,
and wherein said act of receiving comprises receiving at least one resultant content or at least one piece of information representing said at least one resultant content presenting said desired intensity level of said sought piece of metadata and/or said further intensity level of said further sought piece of metadata.

4. The method for accessing a plurality of contents according to claim 3, wherein selecting said sought piece of metadata and said further sought piece of metadata comprises selecting an indicator of combination of said sought piece of metadata and said further sought piece of metadata, said act of determining taking account of said indicator of combination.

5. The method for accessing a plurality of contents according to claim 1, wherein, when at least one first sought piece of metadata and at least one second sought piece of metadata are selected by the user in said plurality, said method further comprises a service platform connected to the communication network determining the at least one resultant content by taking account of a predetermined order of priority between said first and second sought pieces of metadata.

6. The method for accessing a plurality of contents according to claim 1, further comprising rendering said at least one sought piece of metadata of said resultant content and its intensity level.

7. The method for accessing a plurality of contents according to claim 1, wherein said acts of rendering are carried out by using graphic windows, and said graphic windows are rendered on a same screen or on a plurality of screens communicating with a same graphic card.

8. A device for accessing a plurality of contents from at least one information element representing a content, called a reference content, said reference content belonging to a set of contents available, wherein said device for accessing comprises:
a rendering device;
a user interface; and
a non-transitory computer-readable medium and a processing unit, which are configured to:

render a plurality of pieces of metadata of said reference content on the rendering device,
select through the user interface, in said plurality of pieces of metadata of said reference content, at least one piece of metadata called a sought piece of metadata, said sought piece of metadata being associated to a reference intensity level in said reference content,
define through the user interface a desired intensity level of said sought piece of metadata relative to said reference intensity level, said desired intensity level indicating a proportion, relative to the reference intensity level, in which said sought piece of metadata must be present in contents to be determined,
determine from said set of available contents, at least one other content, called a resultant content, based on said sought piece of metadata and said desired intensity level associated to said sought piece of metadata, said resultant content having an intensity level of said sought piece of metadata corresponding to said desired intensity level,
receive from the communication network, said at least one resultant content, or at least one information element representing said at least one resultant content,
render said at least one resultant content or said at least one information element representing said at least one resultant content.

9. A terminal containing the device according to claim 8.

10. A non-transitory computer-readable recording medium on which there is recorded a computer program comprising program code instructions to execute a method for accessing a plurality of contents by using at least one piece of information representing a content selected by the user, when said program is executed by a processor of an access control device, wherein the method comprises:
rendering a plurality of pieces of metadata of said reference content on a rendering device,
selecting through a user interface of the access control device, in said plurality of pieces of metadata of said reference content, at least one piece of metadata, called a sought piece of metadata, said sought piece of metadata being associated to a reference intensity level in said reference content,
defining, through the user interface, a desired intensity level of said sought piece of metadata relative to said reference intensity level, said desired intensity level indicating a proportion, relative to the reference intensity level, in which said sought piece of metadata must be present in contents to be determined,
determining from said set of available contents, at least one other content, called a resultant content, based on said sought piece of metadata and said desired intensity level associated to said sought piece of metadata, said resultant content having an intensity level of said sought piece of metadata corresponding to said desired intensity level,
receiving from the communication network, said at least one resultant content, or at least one piece of information representing said at least one resultant content, and
rendering on the rendering device said at least one resultant content or said at least one piece of information representing said at least one resultant content.

* * * * *